Dec. 20, 1938.   W. G. TWYMAN   2,140,888
CORN POPPER
Filed March 10, 1938   2 Sheets-Sheet 1
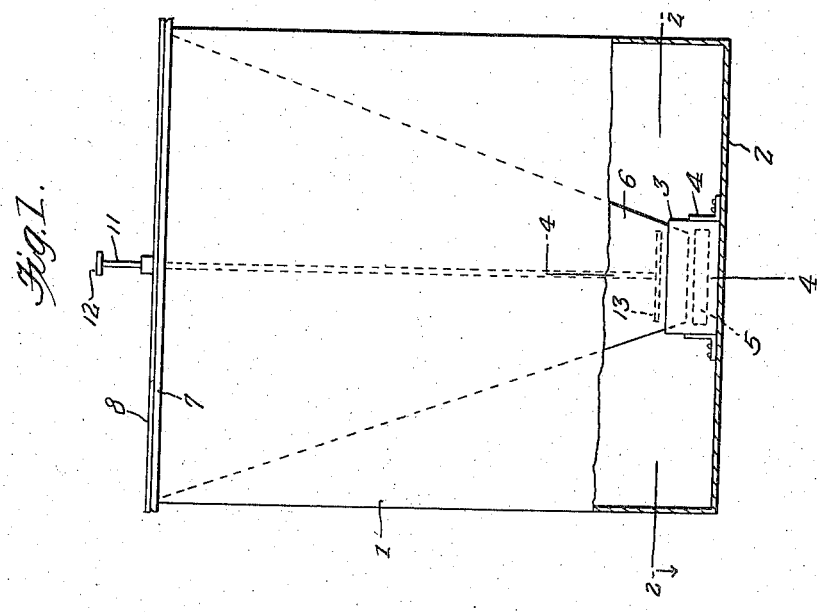
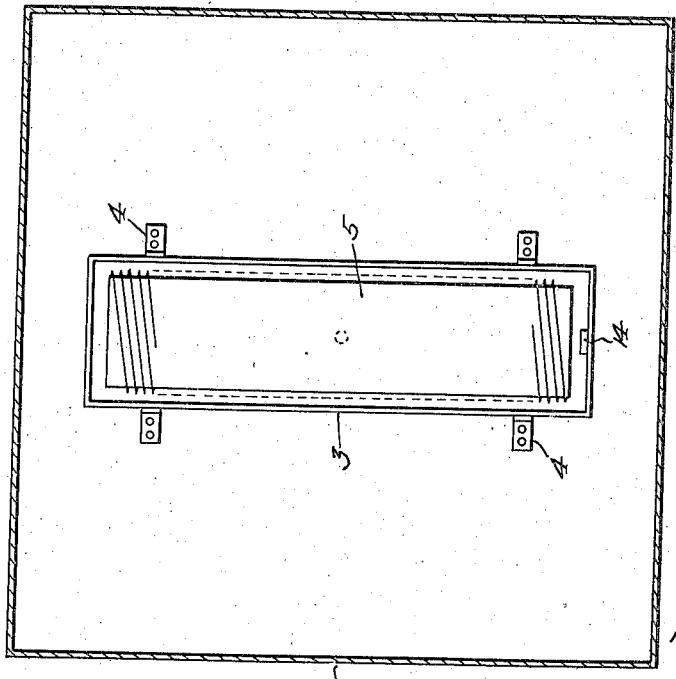
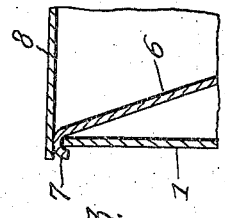
Inventor
William G. Twyman.
By Clarence A. O'Brien
Hyman Berman
Attorney Dec. 20, 1938.  W. G. TWYMAN  2,140,888
CORN POPPER
Filed March 10, 1938  2 Sheets-Sheet 2
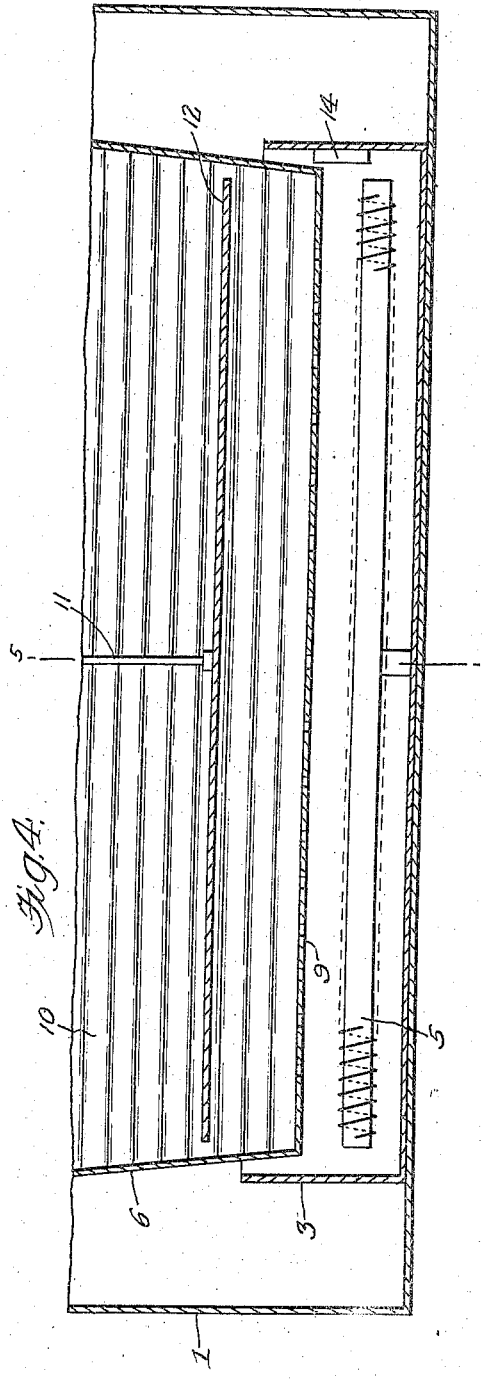
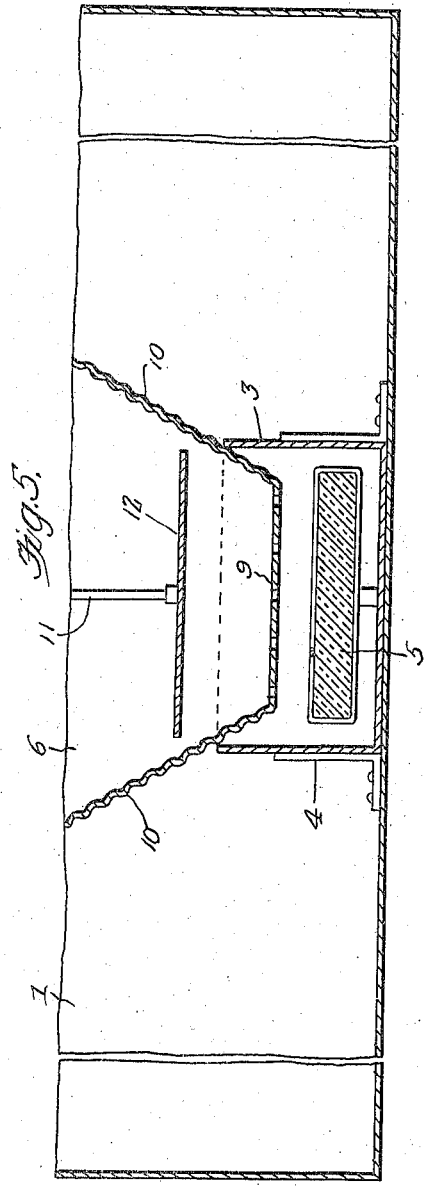
Inventor
William G. Twyman.
By Clarence A. O'Brien
Hyman Berman
Attorneys Patented Dec. 20, 1938

2,140,888

UNITED STATES PATENT OFFICE 2,140,888

CORN POPPER

William G. Twyman, Poteau, Okla.

Application March 10, 1938, Serial No. 195,124

3 Claims. (Cl. 53—4)

The present invention relates to new and useful improvements in electrical corn poppers and has for one of its important objects to provide, in a manner as hereinafter set forth, a device of this character embodying a construction and arrangement whereby oil may be utilized for transmitting the heat to the corn.

Another very important object of the invention is to provide a corn popper of the aforementioned character embodying a novel construction, combination and arrangement of parts whereby the energy of the corn as it is popped will be utilized for elevating or lifting said corn out of the heating medium.

Other objects of the invention are to provide a corn popper of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view principally in side elevation of an embodiment of the invention, the lower portion thereof being broken away in section.

Figure 2 is a view in horizontal section, taken substantially on the line 2—2 of Fig. 1, the hopper being omitted.

Figure 3 is a vertical sectional view through an upper portion of the device.

Figure 4 is a vertical sectional view through the lower portion of the invention, taken substantially on the line 4—4 of Fig. 1.

Figure 5 is a vertical sectional view through the lower portion of the device, taken substantially on the line 5—5 of Fig. 4.

Referring now to the drawings in detail, it will be seen that the embodiment of the invention which has been illustrated comprises a metallic container 1 of suitable dimensions which, as shown to advantage in Fig. 2 of the drawings, may be substantially square in plan. Mounted on the bottom 2 of the container 1 is a removable receptacle or pan 3 for the reception of oil. Suitable elements 4 retain the removable oil pan 3 in position. Mounted in the pan 3 and insulated therefrom is any desired number of electric heating elements 5 having direct contact with the oil.

Suspended in the container 1 is a removable hopper 6 for the reception of the corn. The hopper 6 is provided at its top with a supporting flange 7 which is engaged with the top of the container 1. A removable cover 8 is provided for the hopper 6. As best seen in Fig. 5 of the drawings, the hopper 6 is provided with a perforated bottom 9 which extends downwardly into the pan 3 for receiving oil therefrom. The opposed side walls of the hopper 6 are corrugated or roughened, as at 10, for retaining the popped corn above the oil.

The reference numeral 11 designates a vertical rod in the hopper 6 which extends slidably through the cover 8. The rod 11 is provided on its upper end with a handle 12. Fixed on the lower end of the rod 11 is a cover 13 in the form of a plate which conforms substantially to the shape of the hopper 6.

It is thought that the operation of the invention will be readily apparent from a consideration of the foregoing. The corn to be popped is placed in the lower portion of the hopper 6 beneath the cover 13. The level of the oil in the pan 3 is such that when it enters the lower portion of the hopper 6 through the perforated bottom 9 thereof the corn therein will be covered. When the elements 5 are energized the oil in the pan 3 is heated to the temperature necessary to pop the corn. It may be well to here state that cooking oil is to be used in the pan 3. As the corn pops the self contained energy therein causes it to rise in the hopper 6, the inclined, corrugated walls of said hopper having a tendency to support the popped corn above the oil in the lower portion of said hopper. The vertically movable cover 13 prevents the unpopped corn from being thrown out of the oil by the explosions of other grains and also prevents splashing of the oil. As the popped corn accumulates the cover 13 is elevated thereby. A suitable thermostat 14 is provided in the pan 3 in direct contact with the oil for controlling the elements 5 for preventing the oil from being heated above a predetermined temperature. A safety fuse may also be interposed in the electrical circuit and immersed in the oil for interrupting the circuit should a predetermined temperature be reached. The construction and arrangement is such that the members 6 and 3 may be conveniently removed from the container 1 for cleaning or renewing the cooking oil in the pan 3. Of course, the elements 5 may be supplied with electric current from a suitable source.

It is believed that the many advantages of an electrical corn popper constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

1. A corn popper of the class described comprising a pan for the reception of oil, electric heating means in the pan submerged in the oil and adapted to heat said oil, a hopper, for the reception of corn, having its lower portion extending into the pan and including a bottom having perforations therein for the passage of the oil thereinto, and a cover for the corn mounted for vertical movement in the hopper, said hopper including means on its walls for retaining the popped corn above the oil.

2. A corn popper of the class described comprising a pan for the reception of oil, electric heating means in the pan for heating the oil, a hopper, for the reception of corn, having its lower portion extending into the pan and including a bottom having perforations therein for the passage of the oil thereinto, said hopper including roughened, inclined walls for retaining the popped corn above the oil, a removable cover for the hopper, a vertical rod extending slidably through said cover, and a cover for the corn and the oil mounted on the lower end of said rod and movable vertically in the hopper.

3. A corn popper of the class described comprising a container open at its top, a pan, for the reception of oil, removably mounted on the bottom of the container, electric means in said pan for heating the oil, a hopper removably mounted in the container and including flanges on its top engaged with the top of the container for suspending said hopper in said container, the lower portion of the hopper extending into the pan and including a bottom having perforations therein for the passage of oil thereinto, said hopper further including roughened side walls for retaining the popped corn above the oil, a removable cover for the hopper, a vertical rod in the hopper extending slidably through said cover, and a cover for the corn and the oil on the lower end of said rod and movable vertically in the hopper.

WILLIAM G. TWYMAN.